United States Patent
Kanaya et al.

(10) Patent No.: US 11,530,152 B2
(45) Date of Patent: Dec. 20, 2022

(54) METHOD FOR MANUFACTURING GLASS ARTICLE, AND MELTING FURNACE

(71) Applicant: NIPPON ELECTRIC GLASS CO., LTD., Shiga (JP)

(72) Inventors: Hitoshi Kanaya, Shiga (JP); Yoji Kadotani, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 149 days.

(21) Appl. No.: 16/639,794

(22) PCT Filed: Jul. 25, 2018

(86) PCT No.: PCT/JP2018/027953
§ 371 (c)(1),
(2) Date: Feb. 18, 2020

(87) PCT Pub. No.: WO2019/035327
PCT Pub. Date: Feb. 21, 2019

(65) Prior Publication Data
US 2021/0130214 A1 May 6, 2021

(30) Foreign Application Priority Data
Aug. 18, 2017 (JP) .............................. JP2017-157964

(51) Int. Cl.
*C03B 5/43* (2006.01)
*C03B 5/03* (2006.01)

(52) U.S. Cl.
CPC . *C03B 5/43* (2013.01); *C03B 5/03* (2013.01)

(58) Field of Classification Search
None
See application file for complete search history.

(56) References Cited

U.S. PATENT DOCUMENTS

| | | | | |
|---|---|---|---|---|
| 1,598,308 | A * | 8/1926 | Pike | C03B 5/2252 65/134.2 |
| 2,186,223 | A * | 1/1940 | Willetts | C03B 5/43 432/3 |
| 3,757,020 | A * | 9/1973 | Steitz | C03B 5/027 373/41 |
| 4,348,767 | A * | 9/1982 | Farrar | H05B 3/03 373/30 |

(Continued)

FOREIGN PATENT DOCUMENTS

| CN | 102442756 | 5/2012 |
|---|---|---|
| JP | 64-50999 | 2/1989 |

(Continued)

OTHER PUBLICATIONS

International Search Report (ISR) dated Oct. 23, 2018 in International (PCT) Application No. PCT/JP2018/027953.

(Continued)

*Primary Examiner* — Jodi C Franklin
(74) *Attorney, Agent, or Firm* — Wenderoth, Lind & Ponack, L.L.P.

(57) ABSTRACT

Provided is a manufacturing method for a glass article, including a melting step of generating molten glass (Gm) in a melting furnace (1), the melting furnace (1) being configured to heat the molten glass (Gm) through application of a current with an electrode (11) mounted to a bottom wall part (10).

5 Claims, 3 Drawing Sheets

(56) References Cited

U.S. PATENT DOCUMENTS

| | | | |
|---|---|---|---|
| 4,903,277 A | 2/1990 | Igarashi | |
| 6,334,336 B1* | 1/2002 | Takei | C03B 5/2252 65/134.2 |
| 9,573,850 B2* | 2/2017 | Citti | C04B 35/482 |
| 2003/0074921 A1* | 4/2003 | Ogino | C03C 19/00 65/99.2 |
| 2007/0098036 A1* | 5/2007 | Duch | C03B 5/167 373/37 |
| 2014/0187408 A1* | 7/2014 | Ushimaru | C04B 35/48 501/103 |
| 2014/0230491 A1* | 8/2014 | Bookbinder | C03B 5/1675 65/29.17 |
| 2014/0287905 A1* | 9/2014 | Tokunaga | C03B 5/235 501/66 |
| 2016/0039702 A1* | 2/2016 | Nagai | C04B 35/106 65/134.9 |
| 2016/0340219 A1* | 11/2016 | Miller | C03B 5/43 |
| 2018/0297882 A1* | 10/2018 | De Angelis | C03B 5/44 |
| 2021/0032148 A1* | 2/2021 | Howles | C03B 5/225 |
| 2021/0130214 A1* | 5/2021 | Kanaya | C03B 5/425 |
| 2022/0081367 A1* | 3/2022 | Alessi | C09K 8/805 |
| 2022/0298048 A1* | 9/2022 | Maehara | F27D 3/14 |

FOREIGN PATENT DOCUMENTS

| | | |
|---|---|---|
| JP | 4-317424 | 11/1992 |
| JP | 2002-515396 | 5/2002 |
| JP | 2003-183031 | 7/2003 |
| JP | 2014-5180 | 1/2014 |

OTHER PUBLICATIONS

International Preliminary Report on Patentability dated Feb. 18, 2020 in International (PCT) Patent Application No. PCT/JP2018/027953.

Office Action dated Sep. 24, 2021 in corresponding Chinese Patent Application No. 201880051698.6, with English translation of the Search Report.

* cited by examiner

METHOD FOR MANUFACTURING GLASS ARTICLE, AND MELTING FURNACE

TECHNICAL FIELD

The present invention relates to a manufacturing method for a glass article and a melting furnace.

BACKGROUND ART

A manufacturing method for a glass article, such as a sheet glass, includes a melting step of obtaining molten glass. In the melting step, the molten glass is heated with an electrode mounted to a bottom wall part of a melting furnace through application of a current in some cases (see, for example, Patent Literature 1).

CITATION LIST

Patent Literature 1: JP 2003-183031 A

SUMMARY OF INVENTION

Technical Problem

When the heating through application of a current with an electrode is used, the bottom wall part that is brought into contact with the molten glass in a prospective current application region of the molten glass (a region of the molten glass to which a current is to be applied on design) is liable to become high temperature. Along with this, the molten glass seeps into a portion of the bottom wall part corresponding to the prospective current application region, and a current easily flows through the portion. As a result, convection of glass occurs in the portion of the bottom wall part corresponding to the prospective current application region, and corrosion is liable to proceed. In addition, this also causes erosion of the portion of the bottom wall part corresponding to the prospective current application region. Particularly when a glass composition having a high electrical resistivity is used as the molten glass, the corrosion and the erosion are liable to pose serious problems.

An object of the present invention is to suppress corrosion and prevent erosion in a bottom wall part of a melting furnace.

Solution to Problem

According to one embodiment of the present invention, which has been devised to achieve the above-mentioned object, there is provided a manufacturing method for a glass article, comprising a melting step of generating molten glass in a melting furnace, the melting furnace being configured to heat the molten glass through application of a current with an electrode mounted to a bottom wall part, wherein the bottom wall part has a laminated structure of a plurality of refractory bricks, and wherein the laminated structure is formed so that, in a portion of the bottom wall part corresponding to a prospective current application region of the molten glass, a temperature of a gap between a refractory brick serving as a first layer and a refractory brick serving as a second layer when seen from an inside of the furnace is equal to or less than a temperature at which the molten glass has a viscosity of $10^4$ Pa·s. With such configuration, even when the glass seeps into the gap between the refractory brick serving as a first layer and the refractory brick serving as a second layer in the portion of the bottom wall part corresponding to the prospective current application region of the molten glass, the temperature of the gap is equal to or less than the temperature at which the molten glass has a viscosity of $10^4$ Pa·s, and hence the glass is hardly fluidized, and a current also hardly flows. With this, convection of the glass can be suppressed in the bottom wall part, and corrosion of the bottom wall part can be suppressed. In addition, erosion of the bottom wall part can also be prevented.

In the above-mentioned configuration, it is preferred that the portion of the bottom wall part corresponding to the prospective current application region of the molten glass have a smaller total thickness of the laminated structure than another portion of the bottom wall part. With this, heat dissipation is increased in the portion of the bottom wall part corresponding to the prospective current application region of the molten glass, and hence an internal temperature can be reduced in the portion of the bottom wall part. Accordingly, the temperature of the gap is easily controlled to be equal to or less than the temperature at which the molten glass has a viscosity of $10^4$ Pa·s. In addition, heat dissipation can be suppressed in the other portion, and hence energy efficiency can be increased.

In the above-mentioned configuration, the molten glass may be alkali-free glass. That is, while the alkali-free glass is glass having a high electrical resistivity, the manufacturing method according to the one embodiment of the present invention has the configuration in which current leakage is less liable to occur in the bottom wall part, and hence even such the glass having a high electrical resistivity can be used without any problem.

When the molten glass is the alkali-free glass, it is preferred that the temperature of the gap be 1,300° C. or less.

According to one embodiment of the present invention, which has been devised to achieve the above-mentioned object, there is provided a melting furnace, comprising a bottom wall part having mounted thereto an electrode configured to heat molten glass through application of a current in the furnace, wherein the bottom wall part has a laminated structure of a plurality of refractory bricks, and wherein the laminated structure is formed so that, in a portion of the bottom wall part corresponding to a prospective current application region of the molten glass, a temperature of a gap between a refractory brick serving as a first layer and a refractory brick serving as a second layer when seen from an inside of the furnace is equal to or less than a temperature at which the molten glass has a viscosity of $10^4$ Pa·s. With such configuration, the same effects as those exhibited by the above-mentioned corresponding configuration can be exhibited.

Advantageous Effects of Invention

According to the present invention as described above, the corrosion can be suppressed and the erosion can be prevented in the bottom wall part of the melting furnace.

DESCRIPTION OF EMBODIMENTS

Referring to the accompanying drawings, a manufacturing method for a glass article and a melting furnace according to embodiments of the present invention are described below.

Figure 1:
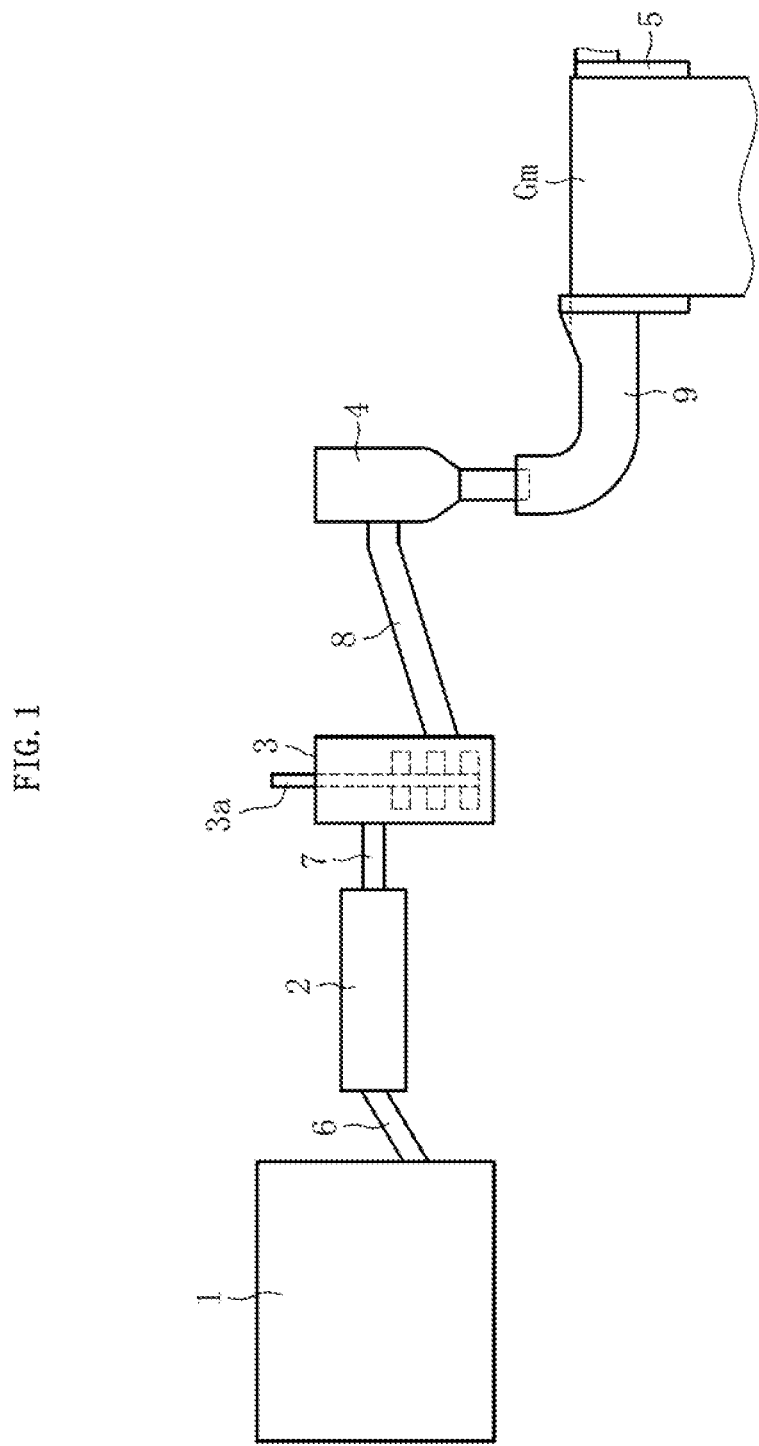
FIG. 1 is a side view for illustrating a manufacturing apparatus for a glass article.

As illustrated in FIG. 1, a manufacturing apparatus for a glass article to be used for the manufacturing method of this embodiment comprises: a melting furnace 1; a refining chamber 2; a homogenization chamber (stirring chamber) 3; a pot 4; and a forming device 5 in the stated order from an upstream side, and these constituents 1 to 5 are connected to each other through transfer pipes 6 to 9. The terms "chamber" of the refining chamber 2 or the like and "pot" as used herein each encompass one having a bath-like structure and one having a tubular structure.

The melting furnace 1 is a space for performing a melting step of obtaining a molten glass Gm. Herein, alkali-free glass may be used as the molten glass Gm. The molten glass Gm formed of the alkali-free glass generally has a high electrical resistivity, and for example, has an electrical resistivity of 100 Ω·cm or more when a heating temperature in the melting furnace 1 is 1,500° C. The molten glass Gm is not limited to the alkali-free glass.

The refining chamber 2 is a space for performing a refining step of refining (degassing) the molten glass Gm supplied from the melting furnace 1 through the action of a refining agent or the like.

The homogenization chamber 3 is a space for performing a homogenization step of stirring, with a stirring blade 3a, the molten glass Gm having been fined to homogenize the molten glass Gm.

The pot 4 is a space for performing a state adjustment step of adjusting the state (e.g., viscosity) of the molten glass Gm so as to be suitable for forming. The pot 4 may be omitted.

The forming device 5 is a device for performing a forming step of forming the molten glass Gm into a desired shape. In this embodiment, the forming device 5 is configured to form the molten glass Gm into a sheet shape by an overflow down-draw method, to thereby manufacture a glass sheet serving as a glass article.

The forming device 5 has a substantially wedge shape in a sectional shape (sectional shape perpendicular to the drawing sheet), and has an overflow groove (not shown) formed on an upper portion thereof. After the molten glass Gm is supplied to the overflow groove through the transfer pipe 9, the forming device 5 is configured to cause the molten glass Gm to overflow from the overflow groove to flow down along both side wall surfaces (side surfaces located on a front surface side and a back surface side of the drawing sheet) of the forming device 5. Moreover, the forming device 5 is configured to cause the molten glasses Gm having flowed down to join each other at lower end portions of the side wall surfaces. With this, the molten glass Gm is formed into a sheet shape. The sheet glass thus formed has a thickness of, for example, from 0.01 mm to 10 mm (preferably from 0.1 mm to 3 mm), and is utilized for a flat panel display, such as a liquid crystal display or an OLED display, a substrate of an OLED illumination or a solar cell, or a protective cover. The forming device 5 may be a device for performing any other down-draw method, such as a slot down-draw method, or a float method.

The transfer pipes 6 to 9 are each formed of, for example, a tubular pipe made of platinum or a platinum alloy, and are each configured to transfer the molten glass Gm in a lateral direction (substantially horizontal direction). The transfer pipes 6 to 9 are heated through application of a current as required.

Figure 2:
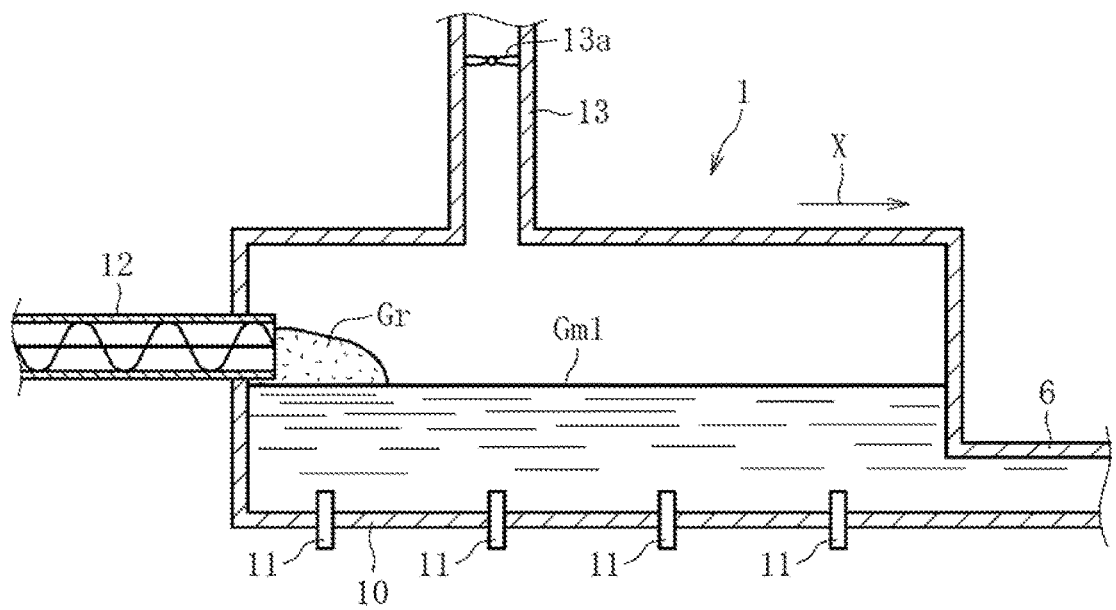
FIG. 2 is a sectional view for illustrating a melting furnace of the manufacturing apparatus for a glass article of FIG. 1.

As illustrated in FIG. 2, the melting furnace 1 is configured to melt glass raw materials Gr (cullet may be included) by heating including heating through application of a current to generate the molten glass Gm. In FIG. 2, the arrow X represents a flowing direction of the molten glass Gm. In the melting furnace 1, a melting space in the furnace is partitioned with a wall part formed of a refractory brick (e.g., a zirconia-based electrocast brick, an alumina-based electrocast brick, an alumina-zirconia-based electrocast brick, an AZS (Al—Zr—Si)-based electrocast brick, or a dense fired brick). In this embodiment, the melting furnace 1 is a single melter having only one melting space for the glass raw materials Gr, but may be a multi melter having a plurality of melting spaces connected to each other.

For the heating through application of a current, a plurality of electrodes 11 are mounted to a bottom wall part 10 of the melting furnace 1 under the state in which the plurality of electrodes 11 are immersed in the molten glass Gm. In this embodiment, heating means other than the electrode 11 is not mounted to the melting furnace 1, and the glass raw materials Gr are melted only by the heating through application of a current (electric energy) with the electrode 11 (full electric melting). The electrode 11 is formed of, for example, rod-shaped molybdenum (Mo). The heating mode of the melting furnace 1 is not limited to the full electric melting, and may be a mode in which the glass raw materials Gr are melted by gas combustion and electric heating in combination. When the gas combustion and the electric heating are used in combination, for example, a plurality of gas burners are mounted to an upper portion of the melting furnace 1.

The melting furnace 1 comprises a screw feeder 12 serving as raw material supply means. The screw feeder 12 is configured to sequentially supply the glass raw materials Gr so as to form a portion prevented from being covered with the glass raw materials (solid raw materials) Gr in part of a liquid surface Gm1 of the molten glass Gm. That is, the melting furnace 1 is of a so-called semi-hot top type. The melting furnace 1 may be of a so-called cold top type in which the liquid surface Gm1 of the molten glass Gm is entirely covered with the glass raw materials Gr. In addition, the raw material supply means may be a pusher or a vibrating feeder.

The melting furnace 1 comprises a gas duct 13 serving as a gas discharge passage configured to discharge a gas in the melting furnace 1 to an outside. The gas duct 13 comprises a fan 13a configured to send the gas to the outside. The fan 13a may not be arranged. In this embodiment, the gas in the melting furnace 1 is air, but is not limited thereto.

Figure 3:
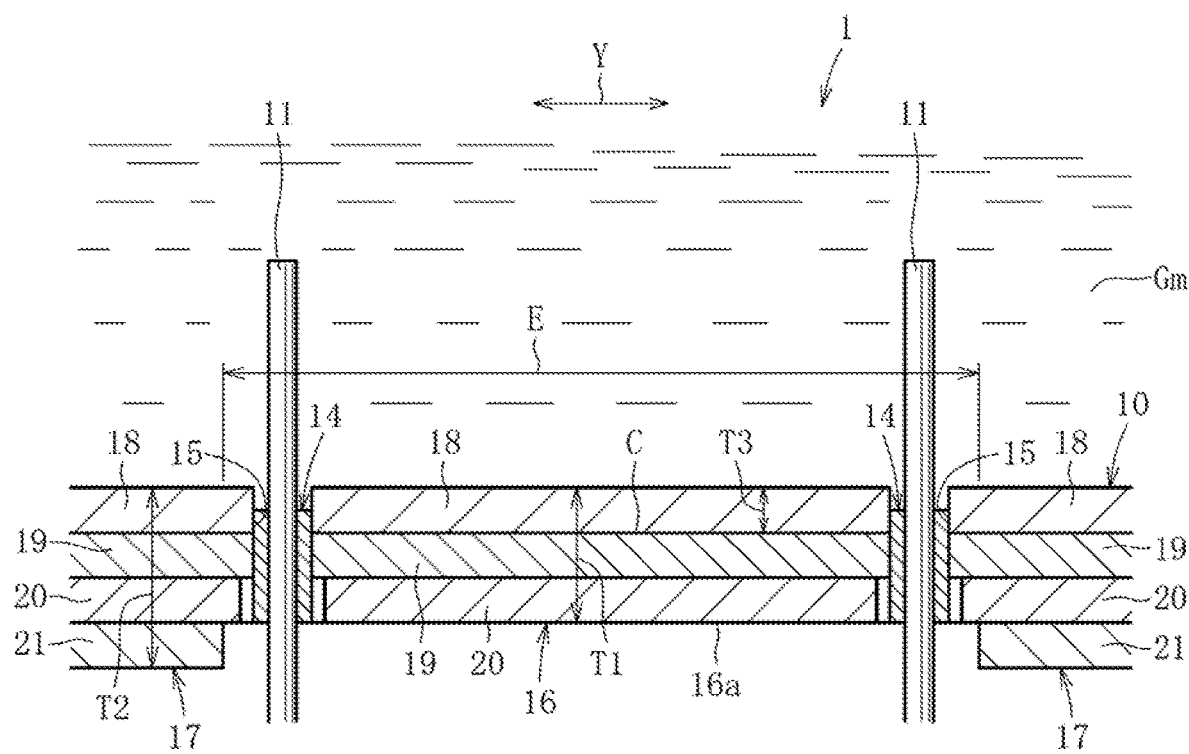
FIG. 3 is an enlarged sectional view for illustrating a periphery of a bottom wall part of the melting furnace of FIG. 2 in an enlarged manner.

As illustrated in FIG. 3, the electrode 11 mounted to the bottom wall part 10 of the melting furnace 1 penetrates through the bottom wall part 10 along a vertical direction to reach an inside of the furnace. In FIG. 3, the arrow Y represents a width direction perpendicular to the flowing direction X of the molten glass Gm. The "along a vertical direction" as used herein has a meaning encompassing even the case in which the electrode 11 is slightly inclined with respect to the vertical direction.

An outer peripheral surface of the electrode 11 is held by an inner peripheral surface of a tubular electrode holder 14. An outer peripheral surface of the electrode holder 14 is held by an inner peripheral surface of a holding hole 15 formed in the bottom wall part 10 under the state in which the outer peripheral surface of the electrode holder 14 is brought into close contact with the bottom wall part 10 of the melting furnace 1. An upper end surface of the electrode holder 14 is brought into contact with the molten glass Gm in a molten state in the furnace.

The electrode holder 14 is formed of, for example, a metal, such as an iron material (e.g., stainless steel). The electrode holder 14 comprises, in an inside thereof, a cooling layer (not shown) through which a cooling medium, such as water, can flow in order to prevent wear damage of the electrode 11 owing to sublimation of molybdenum or the like.

The bottom wall part 10 of the melting furnace 1 comprises: a first bottom wall part 16 comprising a portion corresponding to a prospective current application region E of the molten glass Gm; and a second bottom wall part 17 serving as another portion excluding the first bottom wall part 16. The electrode 11 is mounted to the first bottom wall part 16, and is not mounted to the second bottom wall part 17. The first bottom wall part 16 and the second bottom wall part 17 each have a laminated structure of a plurality of refractory bricks 18 to 21. The second bottom wall part 17 may further comprise an insulating material (not shown) arranged on a lower surface of the refractory brick 21 serving as a lowermost layer of the laminated structure. In addition, also the first bottom wall part 16 may further comprise an insulating material (not shown) arranged on a lower surface of the refractory brick 20 serving as a lowermost layer of the laminated structure.

In the first bottom wall part 16, a temperature of a gap C between the refractory brick 18 serving as a first layer and the refractory brick 19 serving as a second layer when seen from the inside of the furnace is set to be equal to or less than a temperature at which the molten glass has a viscosity of $10^4$ Pa·s. With this, corrosion of the first bottom wall part 16 is suppressed, and erosion of the first bottom wall part 16 can be prevented. From the viewpoint of suppressing the corrosion and preventing the erosion more reliably, the temperature of the gap C is preferably equal to or less than a temperature at which the molten glass has a viscosity of $10^5$ Pa·s, more preferably equal to or less than a temperature at which the molten glass has a viscosity of $10^6$ Pa·s. Meanwhile, from the viewpoint of energy efficiency, the temperature of the gap C is preferably equal to or more than a temperature at which the molten glass has a viscosity of $10^{13}$ Pa·s. When the molten glass Gm is the alkali-free glass, the temperature of the gap C is set to preferably 1,300° C. or less, more preferably 1,200° C. or less, most preferably 1,100° C. or less. Most of the molten glass Gm serving as a heat source is present in the inside of the furnace, and hence when the temperature of the gap C is equal to or less than the temperature at which the molten glass has a viscosity of $10^4$ Pa·s, a temperature of a gap located farther from the inside of the furnace than the gap C, such as a gap between the refractory brick 19 serving as a second layer and the refractory brick 20 serving as a third layer, is also equal to or less than the temperature at which the molten glass has a viscosity of $10^4$ Pa·s.

In this embodiment, in order that the temperature of the gap C be equal to or less than the temperature at which the molten glass has a viscosity of $10^4$ Pa·s, a total thickness T1 of the laminated structure of the first bottom wall part 16 is smaller than a total thickness T2 of the laminated structure of the second bottom wall part 17. With this, heat dissipation is increased in the first bottom wall part 16 as compared to the second bottom wall part 17, and hence the temperature of the gap C can be kept to be equal to or less than the temperature at which the molten glass has a viscosity of $10^4$ Pa·s.

The total thickness T1 of the laminated structure of the first bottom wall part 16 is preferably from 250 mm to 450 mm. In addition a thickness T3 of the refractory brick 18 serving as a first layer is preferably from 75 mm to 225 mm. The thickness of the refractory brick 19 serving as a second or subsequent layer may be set to, for example, from 25 mm to 375 mm. The total thickness T2 of the laminated structure of the second bottom wall part 17 is preferably from 300 mm to 700 mm. The number of layers to be laminated in the first bottom wall part 16 is not particularly limited, and may be two or four or more.

Materials of the refractory bricks constituting the first bottom wall part 16 (or the first bottom wall part 16 and the second bottom wall part 17) are preferably selected in consideration of heat resistance, thermal conductivity, and the like. When the molten glass Gm has a low electrical resistivity (less than 100 Ω·cm at 1,500° C.), for example, an electrocast brick is used as the refractory brick 18 serving as a first layer in the first bottom wall part 16. Meanwhile, when the molten glass Gm has a high electrical resistivity (100 Ω·cm or more at 1,500° C.), for example, an electrocast brick having a high electrical resistivity and/or a dense fired brick is used as the refractory brick 18 serving as a first layer in the first bottom wall part 16. In the first bottom wall part 16, the material of the refractory brick serving as a first layer and the material of the refractory brick serving as a second or subsequent layer may be the same or different from each other.

From the viewpoint that the temperature of the gap C is made equal to or less than the temperature at which the molten glass has a viscosity of $10^4$ Pa·s, a temperature on a bottom surface 16a of the first bottom wall part 16 is preferably 400° C. or less. Meanwhile, from the viewpoint of energy efficiency, the temperature on the bottom surface 16a of the first bottom wall part 16 is preferably 300° C. or more. A temperature on a bottom surface of a bottom wall part of a general melting furnace (a furnace in which the thickness of the bottom wall part is not reduced) is from about 100° C. to about 200° C. because of heat accumulation in an inside of the bottom wall part. Therefore, a temperature on a bottom surface of the second bottom wall part 17 may be set to from about 100° C. to about 200° C. A temperature sensor, such as a thermocouple, may be mounted to the gap C and/or the bottom surface 16a of the first bottom wall part 16.

Figure 4:
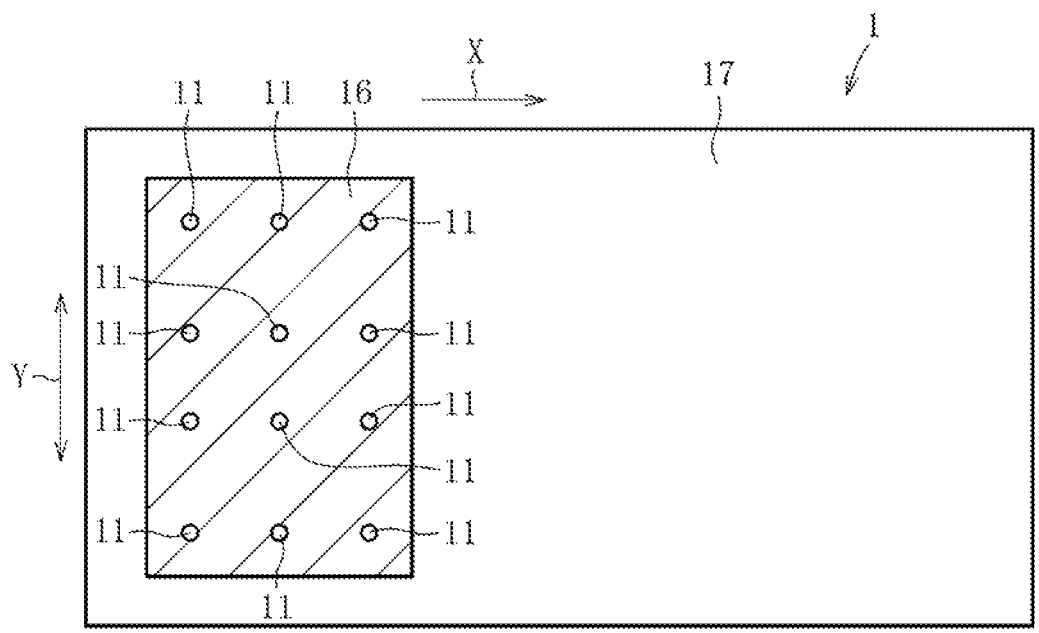
FIG. 4 is an example of a plan view of the bottom wall part of the melting furnace.
Figure 5:
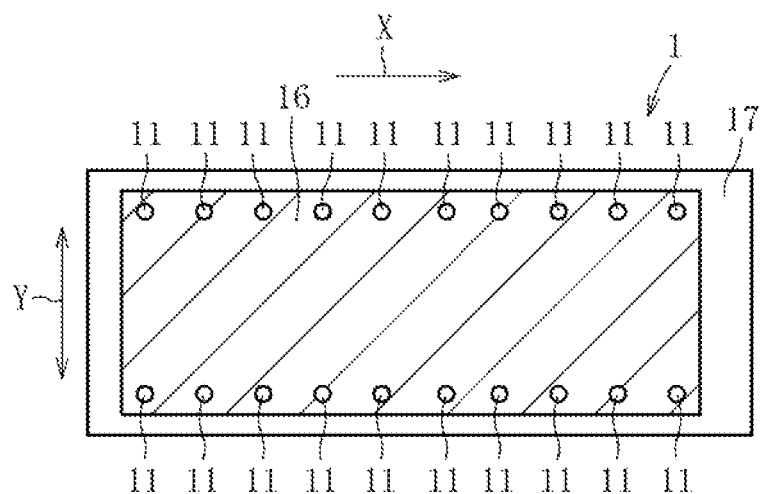
FIG. 5 is another example of the plan view of the bottom wall part of the melting furnace.

The first bottom wall part 16, which has a smaller total thickness of the laminated structure than the second bottom wall part 17, may be arranged only on an upstream side of the melting furnace 1 in the flowing direction X of the molten glass Gm (e.g., within about ½ of the entire length of the melting furnace 1 in the flowing direction X) as illustrated in FIG. 4, or may be arranged in the substantially entire region of the melting furnace 1 in the flowing direction X of the molten glass Gm as illustrated in FIG. 5. In the case of the configuration of FIG. 4, melting by gas combustion and electric heating in combination is often adopted, and in the case of the configuration of FIG. 5, full electric melting is often adopted. In FIG. 4 and FIG. 5, a portion corresponding to the first bottom wall part 16 is hatched in order to clearly represent the region of the first bottom wall part 16. Accordingly, the hatching in those figures does not represent a cross section.

Herein, as illustrated in FIG. 4, when the melting furnace 1 has a large width, a plurality of pairs (two pairs in the illustrated example) of electrodes 11 may be arranged so as to be spaced apart from each other in the width direction Y of the furnace, and a plurality of the electrode pairs may be arranged so as to be spaced apart from each other in the flowing direction X. In addition, as illustrated in FIG. 5, when the melting furnace 1 has a small width, a pair of electrodes 11 may be arranged so as to be spaced apart from each other in the width direction Y of the furnace, and a plurality of the electrode pairs may be arranged so as to be spaced apart from each other in the flowing direction X. In addition, while the illustration is omitted, a pair or a plurality of pairs of electrodes 11 may be arranged so as to be spaced apart from each other in the flowing direction X, and a plurality of the electrode pairs may be arranged so as to be spaced apart from each other in the width direction Y of the furnace. Those arrangement modes of the electrodes 11 are only illustrative, and may be appropriately changed depending on the melting conditions of the molten glass Gm.

Next, the manufacturing method for a glass article using the manufacturing apparatus having the above-mentioned configuration is described.

As described above, the manufacturing method of this embodiment comprises: a melting step; a refining step; a homogenization step; a state adjustment step; and a forming step. The refining step, the homogenization step, the state adjustment step, and the forming step are as described along with the configuration of the manufacturing apparatus, and hence the melting step is described below.

As illustrated in FIG. 3, in the melting step, the molten glass Gm is heated through application of a current with the electrode 11 mounted to the bottom wall part 10. With this, the viscosity of the molten glass Gm in the furnace becomes, for example, from about 10 Pa·s to about $10^3$ Pa·s. At this time, the laminated structure of the first bottom wall part 16 is formed so that the temperature of the gap C between the refractory brick 18 serving as a first layer and the refractory brick 19 serving as a second layer is equal to or less than the temperature at which the molten glass Gm has a viscosity of $10^4$ Pa·s in the first bottom wall part 16. With this, corrosion of the first bottom wall part 16 can be suppressed, and erosion of the first bottom wall part 16 can be prevented. This is because of the following reasons.

When the laminated structure of the first bottom wall part 16 is formed so that the temperature of the gap C is equal to or less than the temperature at which the molten glass Gm has a viscosity of $10^4$ Pa·s, the glass having seeped into and reached the gap C is hardly fluidized because of having a high viscosity. Therefore, convection of the glass can be suppressed in the first bottom wall part 16, and hence corrosion of the first bottom wall part 16 can be suppressed. In addition, as the temperature of the glass is reduced, the electrical resistivity of the glass is increased. Therefore, a current hardly flows through the glass having seeped into the gap. With this, erosion of the first bottom wall part 16 can also be prevented.

Herein, the second bottom wall part 17 is a portion to which the electrode 11 is not mounted. Therefore, irrespective of the temperature of the gap, a current hardly flows through the glass having seeped into the gap, which causes less convection of the glass. Therefore, there is no particular problem when the temperature of the gap between the refractory brick 18 serving as a first layer and the refractory brick 19 serving as a second layer when seen from the inside of the furnace is more than the temperature at which the molten glass has a viscosity of $10^4$ Pa·s in the second bottom wall part 17. As a matter of course, it is also appropriate that the temperature of the gap between the refractory brick 18 serving as a first layer and the refractory brick 19 serving as a second layer when seen from the inside of the furnace be equal to or less than the temperature at which the molten glass has a viscosity of $10^4$ Pa·s in the second bottom wall part 17.

The present invention is not limited to the configurations of the above-mentioned embodiments. In addition, the action and effect of the present invention are not limited to those described above. The present invention may be modified in various forms within the range not departing from the spirit of the present invention.

While the case in which the total thickness T1 of the first bottom wall part 16 comprising the portion of the bottom wall part 10 corresponding to the prospective current application region E of the molten glass Gm is set to be smaller than the total thickness T2 of the second bottom wall part 17 serving as the other portion is described in the above-mentioned embodiment, it is also appropriate to reduce the thickness of the second bottom wall part 17 as in the first bottom wall part 16 to reduce the entire thickness of the bottom wall part 10.

While the temperature of the gap C is made equal to or less than the temperature at which the molten glass has a viscosity of $10^4$ Pa·s in the first bottom wall part 16 by reducing the total thickness T1 of the first bottom wall part 16 comprising the portion of the bottom wall part 10 corresponding to the prospective current application region E of the molten glass Gm in the above-mentioned embodiment, the present invention is not limited thereto. For example, it is also appropriate to make the temperature of the gap C equal to or less than the temperature at which the molten glass has a viscosity of $10^4$ Pa·s in the first bottom wall part 16 by increasing the thickness T3 of the refractory brick 18 serving as a first layer in the first bottom wall part 16.

While the case in which the glass article to be formed by the forming device 5 is the sheet glass is described in the above-mentioned embodiment, the present invention is not limited thereto. For example, it is also appropriate that the glass article to be formed by the forming device 5 be, for example, an optical glass part, a glass tube, a glass block, a glass fiber, or the like, or have an arbitrary shape.

EXAMPLES

As Example of the present invention, a glass sheet was manufactured by using the manufacturing apparatus for a glass article illustrated in FIG. 1 to FIG. 3. At this time, test conditions are as described below.

Glass sheet: alkali-free glass in conformity with a glass substrate for display (product name; OA-11) manufactured by Nippon Electric Glass Co., Ltd.

Heating temperature in the melting furnace 1: 1,500° C.

Refractory brick 18 serving as a first layer: dense zircon fired brick, thickness: 150 mm Refractory brick 19 serving as a second layer: insulation brick, thickness: 175 mm Total thickness T1 of the laminated structure of the first bottom wall part: 325 mm Total thickness T2 of the laminated structure of the second bottom wall part: 500 mm In the first bottom wall part 16, the temperature of the gap C between the refractory brick 18 serving as a first layer and the refractory brick 19 serving as a second layer when seen from the inside of the furnace was set to from 1,000° C. to 1,200° C., in other words, was set to a temperature at which the molten glass had a viscosity of roughly from $10^4$ Pa·s to $10^6$ Pa·s.

After the melting furnace 1 was operated for 7 years, the refractory brick 18 serving as a first layer in the first bottom wall part 16 was visually confirmed. As a result, corrosion and erosion were not able to be detected. Accordingly, it is inferred that, according to the present invention, corrosion can be suppressed and erosion can be prevented in the bottom wall part of the melting furnace.

REFERENCE SIGNS LIST

1 melting furnace
2 refining chamber
3 homogenization chamber
4 pot
5 forming device
6 to 9 transfer pipe
10 bottom wall part
11 electrode
12 screw feeder
13 gas duct
14 electrode holder
16 first bottom wall part
17 second bottom wall part
18 refractory brick serving as first layer
19 refractory brick serving as second layer
C gap
E prospective current application region
Gm molten glass
Gr glass raw material
T1 total thickness of laminated structure of first bottom wall part
T2 total thickness of laminated structure of second bottom wall part

The invention claimed is:

1. A manufacturing method for a glass article, comprising a melting step of generating molten glass in a melting furnace, the melting furnace being configured to heat the molten glass through application of a current with a plurality of pairs of electrodes arranged in a bottom wall part, wherein the bottom wall part has a laminated structure of a plurality of refractory bricks comprising, from an inside bottom surface of the furnace, a first layer of refractory bricks and a second layer of refractory bricks, and a gap between a lower surface of the first layer and an upper surface of the second layer along a horizontal direction, wherein the bottom wall part comprises a first bottom wall part and a second bottom wall part, and the first bottom wall part is a region including the pairs of electrodes and a space between each of the pairs of electrodes, and the second bottom wall part is a region excluding the first bottom wall part, wherein in the first bottom wall part, the second layer is covered with the first layer from above, and the second layer does not directly contact the molten glass in the melting furnace that has not seeped into the gap, wherein in the first bottom wall part, a temperature of the gap is equal to or less than a temperature at which the molten glass has a viscosity of $10^4$ Pa·s, and the temperature of the gap is achieved by heat dissipation in the first bottom wall part.

2. The manufacturing method for a glass article according to claim 1, wherein the first bottom wall part has a smaller total thickness of the laminated structure than the second bottom wall part.

3. The manufacturing method for a glass article according to claim 2, wherein the molten glass is alkali-free glass.

4. The manufacturing method for a glass article according to claim 1, wherein the molten glass is alkali-free glass.

5. The manufacturing method for a glass article according to claim 4, wherein the temperature of the gap is 1,300° C. or less.

* * * * *